United States Patent Office 2,804,469
Patented Aug. 27, 1957

2,804,469

1,1-DICYANO ETHYL-SUBSTITUTED ACTIVE METHYLENE COMPOUNDS AND METHODS FOR THEIR PREPARATION

Jerome C. Westfahl, Cuyahoga Falls, Ohio, assignor to The B. F. Goodrich Company, New York, N. Y., a corporation of New York No Drawing. Application July 19, 1955, Serial No. 523,121

12 Claims. (Cl. 260—464)

This invention relates to new and useful chemical compositions and to their methods of preparation and more particularly pertains to substituted active methylene compounds in which one or both of the hydrogen atoms of the active methylene group is substituted with a

—CH₂CH(CN)₂ group.

The monosubstituted compounds have the structure

in which Z represents a nitro group, an ester linkage, a carbonyl group in which the carbon atom of the carboxy group of said ester and said carbonyl group is attached directly to an active methylene carbon atom, Y represents an ester linkage and in which the carbon atom of the carbonyl group is attached directly to the active methylene carbon atom and when Z is a nitro group Y also represents an alkyl group, and X represents hydrogen and a lower alkyl group.

The disubstituted compounds are believed to cyclize to form the generic structure

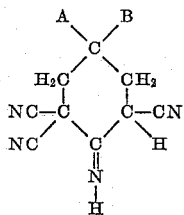

although the possibility of the structure

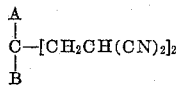

is not to be excluded. Infra-red spectra of the disubstituted compounds show a group of peaks between 2.89 and 3.09 which are thought to be due to =N—H and also peaks at 6.0 to 6.03 and at 6.11 which are probably due to —C=N—. In the claims the term "disubstituted active methylene compounds having two —CH₂CH(CN)₂ groups on the active methylene carbon atom" is intended to include both cyclic and linear forms of the compounds. The symbols, A and B of the generic disubstituted formula given above each represents a carbonyl linkage of a ketone, aldehyde or ester attached directly to the active methylene carbon atom by a carbon-to-carbon bond, a —NO₂ group, and a —CN group and if either A or B is a nitro group, the other of groups A and B can be an alkyl group. The methods of preparation involve the reaction of an active methylene compound having no reactive carbon-to-carbon unsaturation and having at least one active hydrogen on the active methylene carbon atom and substituents A and/or B attached to the methylene carbon atom with a homopolymer of a 1,1-dicyano ethylene in the presence of a basic catalyst.

Monomeric 1,1-dicyano ethylene is an extremely reactive compound which readily forms a homopolymer in the presence of water, alkali or other ionic materials. The 1,1-dicyano ethylene monomer is sufficiently reactive to replace one active hydrogen atom from some active methylene compounds such as those in which two carbonyl groups are attached to the methylene group having two active hydrogen atoms and in some instances a mixture of mono and disubstituted active methylene compounds are formed with monomeric 1,1-dicyano ethylene in the absence of a catalyst. This latter method is more fully described in my copending application Serial No. 523,124, filed July 19, 1955.

The new chemical compositions of this invention are useful for preparing polycarboxylic aliphatic acids by hydrolysis of the cyano or imide or ester linkages, and in the case of the disubstituted compounds by hydrolytic scission of the cyclohexyl ring. The polycarboxylic acids can be esterified to form excellent plasticising agents for vinyl halide polymers.

Active methylene compounds which can serve as one of the reactants for preparing disubstituted

—CH₂CH(CN)₂ derivatives have the generic formula

in which A and B have the same designation as above and X represents an alkyl group or hydrogen. The active methylene compounds which serve as one of the reactants for preparing monosubstituted —CH₂CH(CN)₂ derivatives have the generic formula

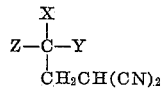

in which Z represents a nitro group, a carbonyl linkage of an ester, a ketone and/or an aldehyde attached directly to the active methylene carbon atom by a carbon-to-carbon bond, Y represents an ester linkage in which the carbon atom of the carbonyl group is attached directly to the active methylene carbon atom by a carbon-to-carbon bond and when Z is a nitro group Y also represents an alkyl group and X represents hydrogen and a lower alkyl group. The members of these generic groups, each of which has an ionization constant at 25° C. in water of at least 1×10⁻¹⁷ and at least one replaceable hydrogen atom on the active methylene carbon, include such compounds as esters of beta-keto carboxylic and thiocarboxylic acids. Illustrative compounds of this type are methyl aceto acetate, ethyl aceto acetate, propyl aceto acetate, and butyl aceto acetate, ethyl benzoyl acetate.

Diesters, commonly called malonic esters which can be employed include dimethyl malonate, diethyl malonate, dipropyl malonate, diethyl ethyl malonate, and other malonic acid esters with at least one active hydrogen atom.

Esters of alpha-nitro carboxylic acids such as methyl alpha-nitro acetate, ethyl alpha-nitro acetate, methyl alpha-nitro propionate and other alpha-nitro carboxylic acid esters can be reacted.

Esters of alpha-formyl carboxylic acids which can be used include methyl alpha-formyl acetate, ethyl alpha-formyl acetate, propyl alpha-formyl acetate, methyl alpha-formyl butyrate, and the corresponding esters of alpha-formyl propionate.

Esters of alpha-cyano carboxylic acids may be methyl alpha-cyano acetate, ethyl alpha-cyano acetate, propyl alpha-cyano acetate, methyl alpha-cyano propionate and other alpha-alkyl alpha-cyano aliphatic acids.

Beta-diketones which can be reacted include 2,4-pentane dione, 2,4-hexane dione, 2,4-decane dione, benzoyl acetone, dibenzoyl methane and the like.

Alpha-nitro ketones which are useful include alpha-nitro acetone, 2-oxo-3-nitro pentane, 1-benzoyl-1-nitro ethane and the like.

Alpha-cyano ketones which react include alpha-cyano acetone, 1-cyano-2-oxo butane, 2-cyano-3-oxo pentane, 1-benzoyl-1-cyano ethane.

Nitro paraffin such as nitro-methane, nitro-ethane, dinitromethane, trinitro-methane, 1,2-dinitro-ethane, the nitro-pentanes, and nitro-cyclohexanes can be used as the active methylene compound.

Additional active methylene compounds that can be employed in the reaction include malononitrile and malonoaldehyde.

All these reactants can be referred to as active methylene compounds having an ionization constant in water at 25° C. of at least $1 \times 10^{-17}$.

Polymeric 1,1-dicyano ethylene defines a homopolymeric compound having at least 3 recurring 1,1-dicyano ethylene units and can be represented graphically by the following structural formula:

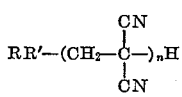

wherein $n$ is an integer of at least 3, R is H or an alkyl group and R′ is O or N (i. e. polymers prepared using $H_2O$, ROH, $NH_3$ or amide). Accordingly, the R′ is a chain initiating group. The intrinsic viscosity of the polymer measured at a concentration of 0.4 gram of polymer in 100 ml. of dimethyl formamide at a temperature of 25° C. can vary between 0.005 and 3.52.

The polymer can be prepared in situ in the reaction mixture by adding the 1,1-dicyano ethylene monomer to a solution of the active methylene compound containing aldehydes, ketones, amines, water, alcohol, or alkaline inorganic salts. Another method of preparing the homopolymer is to add monomeric 1,1-dicyano ethylene to a mixture of the active methylene compound and the alkaline reaction catalyst. An alternative method of making is to make homopolymer by the addition of any of the above-mentioned polymerization catalysts to the monomer, or by the addition of other ionic polymerization catalysts such as alkali metal or alkaline earth metal halides, or other water-soluble salts, or acids. The homopolymer can then be separated and used in the reaction.

The alkaline materials which act as catalysts for the reaction between homopolymers of 1,1-dicyano ethylene and active methylene compounds are alkali metal and alkaline earth metal hydroxides, alkali metal oxides, carbonate and bicarbonates, ammonium hydroxide, secondary amines such as piperidine, tertiary amines such as pyridine, and mixtures of amines and alkali metals and alkali metal alkoxides.

With weakly acid active hydrogen compounds a strongly alkaline catalyst is preferably employed and with strongly acid active hydrogen compounds weak bases will catalyze the reaction very effectively.

The reaction can be carried out in an inert diluent, if desired. Although this is optional, it is preferred because the reaction is somewhat exothermic and the presence of a diluent aids in the dissipation of heat. Of the inert diluents, liquid aromatic hydrocarbons are preferred.

The method of preparing the compounds of this invention comprises bringing together homopolymeric 1,1-dicyano ethylene having at least 3 recurring 1,1-dicyano ethylene units, with an active methylene compound having at least one replaceable hydrogen atom on the active methylene carbon atom and having an ionization constant of at least $1 \times 10^{-17}$ as measured in water at 25° C., said reaction being carried out in the presence of a basic or alkaline condensation catalyst.

The temperature range over which the reaction proceeds can be as low as 0° C. or as high as the reflux temperature of the reaction mixture which is about 100° C. or higher if the diluents are high boiling liquid aromatic hydrocarbons. The preferred reaction temperature is from about 20 to about 60° C. If the latter temperature range is employed cooling of the reaction mixture may be needed to dissipate the heat of reaction.

The proportions of ingredients can be varied widely, but regardless of the proportions of reactants one of the products is one in which all the replaceable hydrogen is removed from an active methylene group. Thus, if an active methylene carbon has two active hydrogen atoms the reaction proceeds to a considerable extent by substitution of both hydrogen atoms of the molecule, even if there is an excess of active methylene compound.

The reaction is preferably carried out by suspending homopolymeric vinylidene cyanide in a liquid inert diluent containing the active methylene compound to be reacted and the alkaline condensation catalyst.

Alternately, a mixture of active methylene compounds can be added to a slurry of the homopolymer and condensation catalyst or a slurry of the polymer can be added to a mixture of active methylene compound and alkaline condensation catalyst.

The examples which follow are intended to be illustrative of the compounds and the method steps of the invention. All parts are by weight unless otherwise specifically indicated.

*Example 1*

30 parts of 1,1-dicyano ethylene and 50 ml. of ethyl alcohol were mixed and maintained at a temperature of less than 30° C. by means of an ice bath until no exothermicity of reaction was evident. A white low molecular weight homopolymer of vinylidene cyanide which formed was suspended in the alcohol. The polyvinylidene cyanide suspension in alcohol was added to 200 ml. of hexane, agitated and the polymer removed from the suspension by filtration under vacuo, washed with hexane, dried in vacuo at 0.01 ml. Hg at 60° C. to yield 37.6 grams of white solid polyvinylidene cyanide. The product was analyzed for carbon, hydrogen and nitrogen and was found to contain an average of 59.75% carbon, 3.7% hydrogen, and 33.39% nitrogen. From these data the polymeric vinylidene cyanide was calculated to have 5 recurring vinylidene cyanide groups.

7.8 parts of polymeric 1,1-dicyano ethylene prepared in accordance with the method set-out in the preceding paragraph were suspended in a solution of 40 ml. of benzene and 5.06 parts of 2,4-pentanedione. The ionization constant of 2,4-pentanedione in water at 25° C. is $1.0 \times 10^{-9}$. 7.91 parts of pyridine were added to the reaction mixture which was agitated for 10 minutes, and maintained during the period of agitation at a temperature of 50 to 60° C. During the course of the agitation, the polymer apparently dissolved in the liquid medium since the polymeric suspension disappeared. The resulting solution was then treated with 100 ml. of water and 10 ml. of concentrated hydrochloric acid diluted with 100 ml. of hexane and a brown cocoa colored solid settled out. This was isolated by filtration with suction. The reaction product was purified by dissolving the solid in boiling ethyl acetate and filtering hot through a filter aid to yield a yellow solution. When diluted with hexane and filtered, the solution yielded 5.2 grams pale yellow solid having a melting point in its purest state of 173 to 175.5° C. and exhibiting decomposition under prolonged heating. The product was analyzed and found to contain an average of 61.00% carbon, 4.95% hydrogen and 21.84% nitrogen and it had the following structural formula:

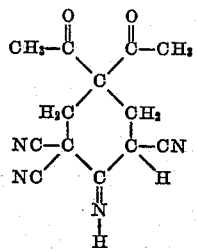

*Example II*

8.7 parts of polyvinylidene cyanide prepared in accordance with the method described in Example I were suspended in a solution of 40 ml. benzene and 6.51 parts of ethyl acetoacetate. The ionization of ethyl acetoacetate in water at 25° C. is $2.1 \times 10^{-11}$. 7.91 parts of pyridine were added to the polyvinylidene cyanide suspension with continuous agitation. The reaction was carried out at a temperature of about 50 to 60° C. A 10% solution of concentrated hydrochloric acid in water was then added to the reaction mixture. A small amount of suspended polymeric vinylidene cyanide remained in the reaction mixture. This polymer was removed by filtration. The organic layer was separated, the aqueous layer was extracted with ether, and the combined solution was dried with magnesium sulfate. After filtering free of the magnesium salt, the remaining ether and benzene were removed by vacuum distillation. The reaction product consisting of 13.15 parts of a yellow greasy solid was then dissolved in ethyl acetate, diluted with 2 volumes of hexane at room temperature and cooled whereby a colorless solid was obtained which was removed from the liquid medium by filtration. The solid reaction product had a melting point of 115–120° C. (decomposed) and was found to contain an average of 58.65% carbon, 5.25% hydrogen and 19.56% oxygen and to have a structural formula as follows:

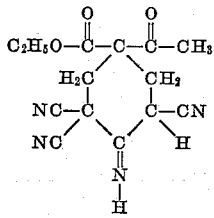

*Example III*

The following set of methylene compounds were reacted with polymeric vinylidene cyanide in accordance with the method set-out in Example I. Polymeric vinylidene cyanide employed was prepared in accordance with the method described in Example I. Set out hereinbelow in tabular form are the reactants employed in a specific reaction of an active methylene compound with polymeric vinylidene cyanide, the basic condensation catalyst employed, and the respective amounts of the reactants and base employed as well as the carbon, hydrogen and nitrogen analysis found for the reaction product which was formed in the reaction and the structural formula for the reaction product corresponding to the carbon, hydrogen and nitrogen analysis:

(a)

| | | |
|---|---|---|
| Benzoyl acetone | parts | 16.22 |
| Polymeric vinylidene cyanide | do | 16.52 |
| Benzene | ml | 80 |
| Pyridine | parts | 15.82 |

The reaction product recovered was a colorless crystalline solid having a melting point in its purest state of 160 to 161.5° C. It was discolored when maintained at its melting point for an extended period. The product can be represented by the following structural formula:

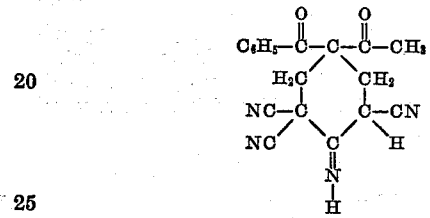

(b)

| | | |
|---|---|---|
| Dibenzoyl methane | parts | 7.2 |
| Polyvinylidene cyanide | do | 7.8 |
| Benzene | ml | 40 |
| Pyridine | parts | 7.91 |

9.07 parts of a dry yellow solid reaction product was obtained having a purified melting point of 175.5 to 177° C. which exhibited slight discoloration when maintained at its melting point temperature for an extended period. It had the following structural formula:

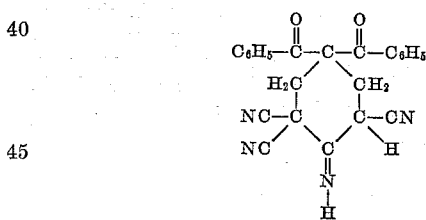

(c)

| | | |
|---|---|---|
| Malononitrile | parts | 3.309 |
| Polyvinylidene cyanide | do | 7.8 |
| Benzene | ml | 60 |
| Pyridine | parts | 7.91 |

A crude reaction product that can be described as a tan solid was obtained and upon further purification yielded a colorless solid having a melting point in its purified form of 234 to 235° C. and exhibiting decomposition when maintained at its melting point for an extended period of time. It had the following structural formula:

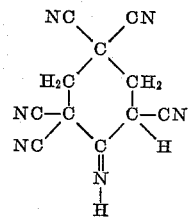

*Example IV*

7.81 parts of polyvinylidene cyanide were suspended in 40 parts of 2-nitro propane. The suspension was treated with 8.52 parts of piperidine for a period of 15 minutes while constantly agitating the mixture until no further heat of reaction was observed. It was observed during the course of the piperidine addition that the polymeric vinylidene cyanide appeared to become dissolved. The reaction mixture was neutralized with 18% solution of hydrochloric acid in water and traces of unreacted polymeric vinylidene cyanide were noted. The reaction mixture was diluted with 100 ml. of ether and the ethyl layer was separated from the aqueous layer. The organic layer was filtered to remove suspended unreacted polymeric vinylidene cyanide and the filtrate was dried with magnesium sulfate, filtered free of magnesium sulfate and freed of ether and 2-nitro propane by vacuum distillation. The resulting reaction product, a brown, slightly sticky, crystalline substance, was recrystallized from ethyl alcohol to yield 9.2 parts of a yellow crystalline substance having a melting point in its purest state of 82 to 83° C. It contained an average of 50.14% carbon, 5.44% H and 25.26% N and had a structural formula as follows:

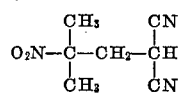

*Example V*

20.0 parts of mononitroethane were reacted with 3.9 parts of polymeric vinylidene cyanide in the presence of 3.95 parts of pyridine in accordance with the method set out in Example IV. The polyvinylidene cyanide employed was prepared in accordance with the method set out in Example I. A crude reaction product of 0.94 part was obtained and upon recrystallization from an acetic acid-water mixture yielded a solid crystalline substance having a melting point of 216.5° C. that decomposed when maintained at its melting point for an extended period of time. On analysis it was found to contain 51.79% carbon, 4.00% H, and 30.13% N. It had the following structural formula:

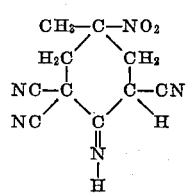

*Example VI*

56.46 parts of diethyl ethylmalonate were reacted with sodium ethoxide to form the corresponding sodium salt. The sodium salt obtained was then dispersed in an excess of diethyl ethylmalonate to which was added a mixture consisting of 7.81 parts of polymeric vinylidene cyanide suspended in diethyl ethylmalonate. This mixture was agitated, heated at 50 to 60° C. for 30 minutes, cooled, acidified with a 10% solution of concentrated hydrochloric acid and the reaction mixture was divided into 2 layers by an ether extraction. The organic layer was separated from the aqueous layer, filtered to remove any suspended, unreacted polymeric vinylidene cyanide, dried with magnesium sulfate, filtered to remove magnesium sulfate, and subjected to vacuum to remove ether and excess diethyl ethylmalonate. The resulting brown organic liquid was distilled at 0.01 ml. at 150 to 160° C. It yielded 21.97 parts of a nearly colorless liquid which when cooled turned to a somewhat greasy solid. The product was further purified by recrystallization from ethyl alcohol. It had a melting point of 55.5 to 56.5° C. and a structural formula as represented below:

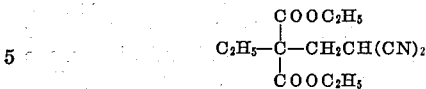

This compound contained 58.90% C, 6.93% H, and 10.50% N. Diethyl ethylmalonate is an extremely weak acid with an ionization constant in water at 25° C. of $1 \times 10^{-15}$ and therefore a strongly alkaline catalyst is necessary to cause the reaction which the hydrogen atom of the methylene group is replaced by $-CH_2CH(CN)_2$ group to proceed.

*Example VII*

9.61 parts of alpha-benzoyl ethylacetate, 7.8 parts of polymeric vinylidene cyanide were reacted in accordance with the method set out in Example I.

A reaction product was obtained from the reaction mixture by dilution with hexane and filtration according to the methods also set out in Example I. A semi-solid filtrate was recovered, dissolved in ethyl acetate, dried with magnesium sulfate, filtered free of magnesium sulfate, diluted with hexane, coled and a nearly colorless solid substance was recovered. The product after recrystallization from a hexane-ethyl acetate mixture had a melting point of 212 to 213.5° C. and can be represented by the following structural formula:

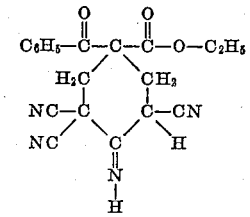

During the filtration of the colorless solid substance the solvent contained a viscous liquid which when isolated distilled at 0.01 ml. at 230° C. yielded a colorless crystalline substance at room temperature having a melting point of 77 to 78° C. and having a structural formula:

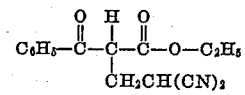

*Example VIII*

Diethylmalonate (1.0 mole) was reacted with 0.1 mole of 1,1-dicyano ethylene polymer in the presence of 0.1 mole of pryidine. From this reaction a mixture of mono and disubstituted diethylmalonate derivatives was recovered. The disubstituted product has the structural formula:

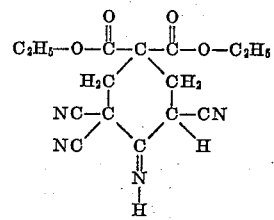

It is a crystalline material with a melting point of 143.5–144.5° C. Hydrolysis of this compound with concentrated HCl yielded gamma-carboxy pimelic acid.

The monosubstituted derivative of the formula:

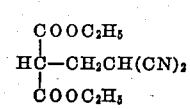

is a liquid with a B. P. of 115–127° C. at 0.02 mm. On alkaline hydrolysis with aqueous sodium hydroxide 1,1,3,3-tetracarboxy propane, with a melting point of 173° C. was recovered. Diethyl malonate is a relatively weak acid with an ionization constant of $5 \times 10^{-14}$ at 25° C. in water.

*Examples IX to XV*

By following the procedure described above it is possible to prepare the compounds in which both active methylene hydrogen atoms are replaced to form cyclohexyl imine compounds, as shown in the chart below:

| | Active Methylene Compound | Ka at 25° C. in Water | Reaction Product |
|---|---|---|---|
| IX | $H_5C_2OOC-CH_2-NO_2$ | $1.5 \times 10^{-6}$ | 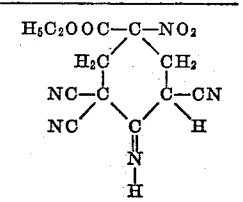 |
| X | $H_3C-\overset{O}{\underset{\|}{C}}-CH_2-NO_2$ | $8 \times 10^{-6}$ | 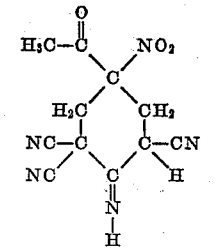 |
| XI | $O_2N-CH_2-NO_2$ | $2.7 \times 10^{-4}$ | 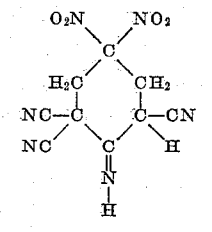 |
| XII | $H_5C_2OOC-CH_2-CN$ | $1 \times 10^{-9}$ | 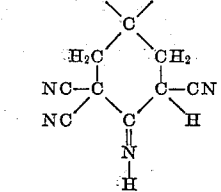 |
| XIII | $H-\overset{O}{\underset{\|}{C}}-CH_2-\overset{O}{\underset{\|}{C}}-H$ | $1 \times 10^{-5}$ | 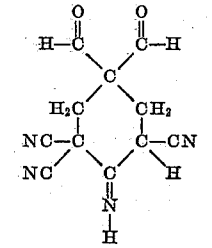 |
| XIV | $H_3C-\overset{O}{\underset{\|}{C}}-CH_2\overset{O}{\underset{\|}{C}}-H$ | $1.2 \times 10^{-6}$ | 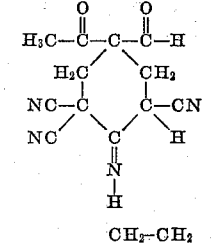 |
| XV | 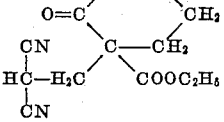 (left structure) | $3 \times 10^{-12}$ | (right structure) |

Example XVI

A high molecular weight polymer having an intrinsic viscosity of 3.52, at a concentration of 0.4 g. in 100 ml. of dimethylformamide containing 2% sulfur dioxide was prepared. This high molecular weight polymer was reacted with 2-nitro propane by the procedure described in Example IV. The yield of

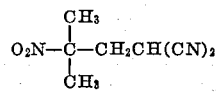

was 12.6%. If the reaction is carried out in an inert solvent for the polymer better yields are produced.

Example XVII 1,1-dicyano ethyl substitution of active methylene compounds by replacement of an active hydrogen atom can also be effected with 1,1,3,3-tetracyano propane. A reaction between 2-nitro propane and 1,1,3,3-tetracyano propane was carried out in the presence of piperidine. A 42.6% yield of

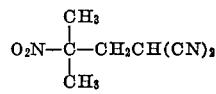

was recovered.

Example XVIII

A reaction between 20 ml. of diethyl malonate and 7.2 parts of 1,1,3,3-tetracyano propane was effected at a temperature of 50–60° C., in the presence of 5 ml. pyridine. From this reaction mixture a viscous liquid and solid, resembling the end products described in Example VIII were recovered.

Example XIX

A condensation polymer made by an uncontrolled basic condensation of malononitrile and formaldehyde was mixed with an excess of 2-nitro propane and a small amount of piperidine. The mixture was heated to 50–60° C. and held at that temperature for about a half hour. Small quantities of

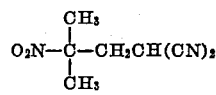

were isolated from the reaction mixture. The yield of the substituted nitro propane was rather low, but the end product was proven to be identical with that formed by the reaction of 2-nitro propane and polymeric 1,1-dicyano ethylene.

Although I have described my invention by specific examples, it is believed apparent that there are numerous modifications possible in the ingredients reacted, their proportions and the reaction conditions. Accordingly, the invention shall be limited by the terms of the appended claims and not by the specific examples set forth above.

I claim:

1. Compounds selected from the class consisting of (1)

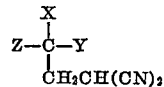

wherein Z is selected from the class consisting of a nitro group, lower alkyl ester linkage in which the carbon atom of the carbonyl group of said ester is attached directly to an active methylene carbon atom of the generic structure, a

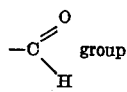

and hydrocarbon substituted carbonyl group having from 1 to about 6 carbon atoms and being free of non-aromatic unsaturation the carbon atom of the carbonyl group being attached directly to the carbon atom of said generic structure, Y is selected from the class consisting of a lower alkyl group when Z is a nitro group and a lower alkyl ester linkage in which the carbon atom of the carbonyl group is attached directly to the carbon atom of said generic structure, and X is selected from the class consisting of hydrogen, a lower alkyl group and a hydrocarbon residue of a cyclohexylketone ring, and (2)

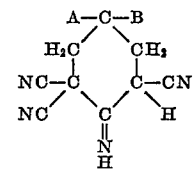

in which A is selected from the class consisting of a

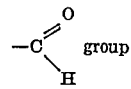

a hydrocarbon substituted carbonyl group having from 1 to about 6 carbon atoms and containing no non-aromatic unsaturation and lower alkyl ester linkages in which the carbon atom of the carbonyl group and of the ester linkages is attached directly to the ring carbon atom of the generic structure, a CN group, a nitro group, and, when B is a nitro group A further represents a lower alkyl group, and B is selected from the class consisting of carbonyl and ester linkages in which the carbon atom of the carbonyl group of said linkages is attached directly to the ring carbon atom of the generic structure, and a nitro group.

2. A lower nitro alkane having from 1 to 2

$$CH_2CH(CN)_2$$

groups attached to the carbon atom containing the nitro group.

3.

4.

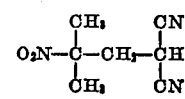

5.

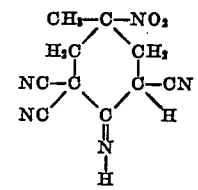

6.

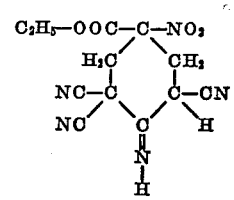

7.

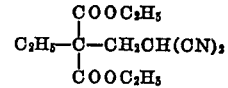
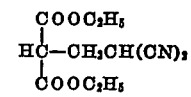

8. The method which comprises reacting an active methylene compound having no non-aromatic unsaturation and having an ionization constant in water at 25° C. of at least $1 \times 10^{-17}$ and at least one replaceable hydrogen atom on the active methylene group with a member selected from the class consisting of 1,1,3,3-tetracyanopropane, a basic condensation product of malononitrile and formaldehyde and a homopolymer of 1,1-dicyano ethylene in the presence of a basic catalyst, whereby at least one replaceable hydrogen atom is substituted with a

—$CH_2CH(CN)_2$ group.

9. The method which comprises reacting compounds having no reactive carbon-to-carbon unsaturation selected from the class consisting of 1,1-dicarboxylic acid esters, malonic acid esters, alpha-nitro carboxylic acid esters, alpha-formyl carboxylic acid esters, alpha-cyano carboxylic acid esters, beta-diketones, alpha-nitro ketones, alpha-cyano ketones, and nitro paraffins, said compounds having at least one replaceable hydrogen atom on an active methylene carbon atom and an ionization constant in water at 25° C. of at least $1 \times 10^{-17}$ with a homopolymer of 1,1-dicyano ethylene in the presence of a basic catalyst, whereby at least one replaceable hydrogen atom on an active methylene carbon atom is replaced with a —$CH_2CH(CN)_2$ group.

10. The method which comprises reacting an unsubstituted saturated diester of malonic acid with a homopolymer of 1,1-dicyano ethylene in the presence of a basic catalyst at a temperature of from about 0° C. to about 100° C., whereby said malonic ester is converted to a mixture of derivatives having one and two

—$CH_2CH(CN)_2$ groups replacing the active hydrogen atoms on the active methylene carbon atom.

11. The method which comprises reacting a nitro alkane with a homopolymer of 1,1-dicyano ethylene in the presence of a basic catalyst at a temperature of from about 0° C. to about 100° C., whereby a —$CH_2CH(CN)_2$ group is substituted for each hydrogen atom on the carbon atom to which the nitro group is attached.

12. The method of claim 11 in which the nitro compound is 2-nitro propane.

References Cited in the file of this patent

UNITED STATES PATENTS

| | | |
|---|---|---|
| 2,361,259 | Bruson | Oct. 24, 1944 |
| 2,460,536 | Rogers | Feb. 1, 1949 |
| 2,541,351 | Gilbert | Feb. 13, 1951 |
| 2,575,376 | Warner et al. | Nov. 20, 1951 |